United States Patent
Wellin

[11] 3,871,203
[45] Mar. 18, 1975

[54] TUBULAR FASTENER SETTING POWER TOOL

[75] Inventor: Martin Wellin, Oak Park, Mich.

[73] Assignee: U.S. Industrial Tool & Supply Co., Detroit, Mich.

[22] Filed: Mar. 25, 1974

[21] Appl. No.: 454,080

[52] U.S. Cl. .................................................. 72/114
[51] Int. Cl. ............................................. B21j 15/34
[58] Field of Search ............................. 72/114, 391

[56] References Cited
UNITED STATES PATENTS
2,753,072 7/1956 Mitchell ............................... 72/391
3,197,987 8/1965 Martin ................................. 72/114

Primary Examiner—C. W. Lanham
Assistant Examiner—Gene P. Crosby
Attorney, Agent, or Firm—Krass & Young

[57] ABSTRACT

A tool for collapsing internally threaded tubular blind fasteners is formed by securing a special bit in the chuck of a rotary hand-held reversible power tool and retaining an annular pressure ring to the body of the tool so that it surrounds the bit. The pressure ring has a magnetic surface adapted to retain the flange of a tubular fastener when the unthreaded pilot section of the bit extends through the thread of the fastener. The pressure ring is spring loaded in its forward position and when the fastener is inserted in its installing hole and forward pressure is exerted through the tool against the flange, the pressure ring retracts allowing a threaded section on the bit to engage the fastener and collapse it axially. The tool is then reversed to free the bit from the set fastener.

5 Claims, 5 Drawing Figures 3,871,203

TUBULAR FASTENER SETTING POWER TOOL

BACKROUND OF THE INVENTION

1. Field of the Invention

This invention relates to tools for setting collapsible screw threaded blind fasteners and more particularly to attachments which can be secured to conventional reversible rotary power tools to convert them for use in collapsing fasteners.

2. Prior Art

Tubular fasteners having a flange disposed at one end and an internally threaded section disposed at the other end are commonly employed as rivets to join a pair of sheets or plates or as female threaded fasteners. These fasteners may be inserted into a blind hole until the flange abuts the accessible side of the hole and then locked in place by pulling the threaded end toward the flange end so that the intermediate fastener wall collapses outwardly.

Tools for setting these fasteners have typically consisted of hand held fluid or electrically powered reversible rotary tools designed so that the bit may be powered to move axially as well as in the rotational mode. The bit is inserted through the flanged end of an uncollapsed fastener disposed in its supporting hole and rotated so that the bit engages the threaded section at the far end. The tool is then retracted axially, collapsing the fastener and then rotated in the reverse direction to free the bit from the fastener. In another class of setting tools the bit is only rotatable and depends upon the axial force exerted by the rotating bit's engagement with the threaded aperture in the fastener to collapse the fastener. Since hand held reversible rotary power tools are readily available, an attachment for such conventional tools which would convert them to a form useful in setting tubular collapsible fasteners would be desirable.

The present invention contemplates a setting tool for tubular fasteners of the type depending upon the rotation of bit in the fastener to achieve axial collapse of the fastener, which is simple in construction so as to be low in cost and reliable in operation. More particularly, the present invention contemplates an attachment which may be readily secured to a conventional reversible hand held rotary power tool to convert it into a tubular fastener setting device as contemplated by the broader aspects of the invention.

SUMMARY OF THE INVENTION

The invention broadly takes the form of a reversible hand-held rotatable power tool having a bit with an unthreaded pilot section at its forward end adapted to pass through the thread of a tubular fastener, and a threaded section formed on the bit adjacent to the pilot section. An annular pressure pad is supported on the tool housing so as to surround the bit at the rear of the threaded section. A magnet on the pressure pad retains the flange of collapsible fastener to the tool so that the pilot section of the bit extends through the thread on the fastener. The pressure pad is supported for movement toward the tool body, against a spring bias, when forward pressure is exerted on the tool pressing the fastener flange against the accessible face of the sheet surrounding the hole in which the fastener is inserted. As the pressure pad is forced rearwardly the threaded section of the bit enters the thread of the fastener and withdraws that section, axially collapsing the fastener and securing it in its hole. The tool is then reversed allowing the bit to be withdrawn from the threaded section.

Attachment of the pressure pad to the cylindrical collar of a conventional hand-held power tool is achieved by use of annular adapter ring secured to the collar by set screws and having a threaded outer surface. A retaining ring for the pressure pad is threaded to the adapter. Another set screw secures the ring in a position on the adapter which sets the limit of axial motion of the pressure ring.

In use, when the pilot end of the bit is inserted through a loose tubular fastener from the flange end, the flange is attracted to the magnet allowing the tool to be used to insert the fastener in its hole. After is is inserted, forward pressure is exerted on the tool and the tool is powered to rotate in a direction so as to engage the threaded section of the bit with the fastener to cause the fastener to collapse. The tool is then simply reversed allowing the bit to be withdrawn.

Other objectives, advantages and applications of the present invention will be made apparent by the following detailed description of the preferred embodiment of the invention. The description makes reference to accompanying drawings in which.

Figure 1:
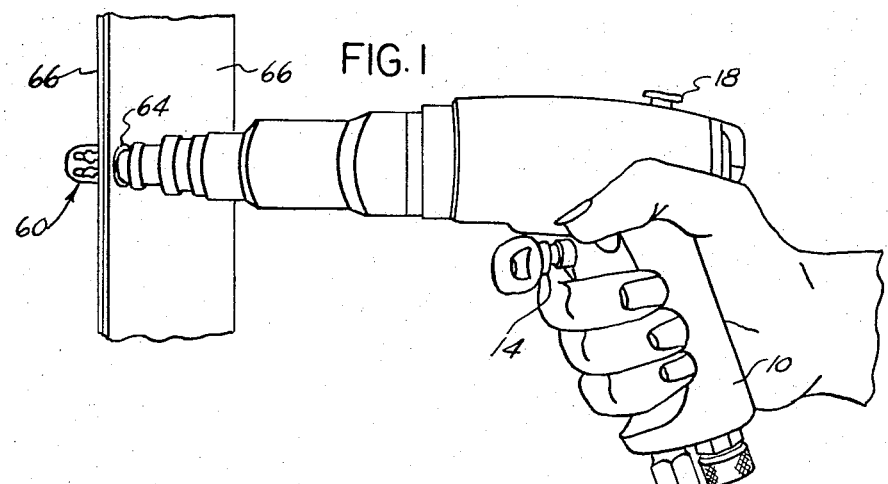
FIG. 1 is a perspective view of a tool for setting collapsible tubular fasteners in accordance with the present invention.
Figure 2:
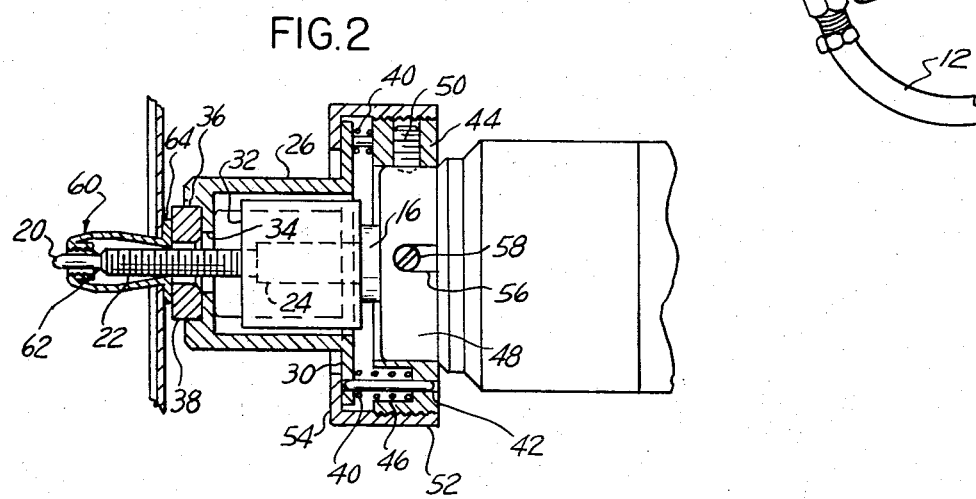
FIG. 2 is a sectional view through the tool of FIG. 1.
Figure 3:
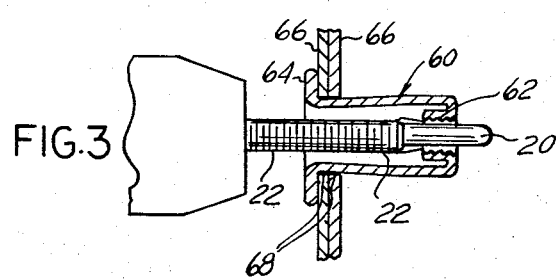
FIG. 3 is a partial sectional view through the forward end of the tool of FIG. 1 and a collapsible fastener inserted in an aperture.
Figure 4:
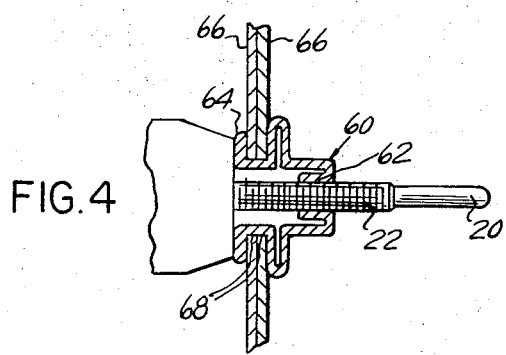
FIG. 4 is a partial sectional view similar to FIG. 3 showing the action of the tool in collapsing the fastener.
Figure 5:
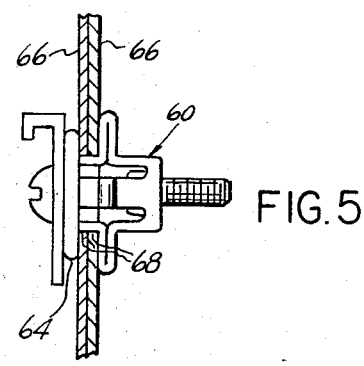
FIG. 5 is a partial sectional view similar to FIG. 3 showing the collapsed fastener.

Referring to the drawings, the preferred embodiment of the fastener setting device is built around a rotary hand tool 10. While tool 10 is preferably of the pneumatic type, powered by an air line 12, it might alternatively be hydraulicaly or electrically powered. The tool may be turned on by depressing a trigger 14 causing suitable motor within the tool (not shown) to rotate an output chuck 16. The direction of rotation of the chuck 16 may be reversed by depressing a button 18 located at the top of the tool.

The bit retained in the chuck terminates in a cylindrical section 20 having a length and diameter dependent upon the size of tubular fastener the tool is to be used with. The section 20 preferably slightly longer than the threaded section within the fastener and has a diameter small enough to allow it to easily pass through the threaded section.

The pilot section 20 of the bit is formed on the end of a cylindrical threaded section 22 having a thread which mates with the internal thread on the threaded fastener. The section 22 has a length slightly greater than the uncollapsed length of the tubular fastener that the tool is to be used with. The threaded section 22 terminates in a section 24 of suitable cross section for retention in the chuck 16 of the tool.

The tool 10 is further provided with a pressure ring which is generally cup shaped and comprises a cylindrical body 26, a radial forward face 28 and an outwardly extending rear flange 30. The body 26 has one or more cut-aways or windows 32 formed in its side chuck 16.

The forward face 28 of the pressure ring has a central aperture 34 through which the threaded section 22 of the bit passes. The forward face 28 is recessed as at 36 and an annular magnet 38 is inset within the recess so that the forward face of the magnet extends out beyond the forward face of the pressure ring. The central hole in the magnet 38 is aligned with the hole 34 in the pressure ring.

Four pins 40 are affixed in holes formed through the rear flange 30 of the pressure ring and extend rearwardly from the ring. Their far ends make sliding fits in apertures 42 formed in an annular adapter ring 44. Coil springs 45 surround the pins between the rear flange 30 and the adapter ring 44 and urge the pressure ring away from the adapter ring. Portions of the springs are retained in enlargement 46 formed in the forward ends of the recesses 42.

The adapter ring 44 is affixed to a collar 48 forming the forward part of the tool housing by means of set screws 50. The outer diameter of the adapter ring 44 is threaded and mates with an internal thread formed on a cylindrical retaining ring 52. The retaining ring has an inwardly extending forward flange 54 that terminates short of the body portion 26 of the pressure ring. The flange 54 acts a forward stop for movement of the pressure ring. The springs 45 urge the pressure ring forwardly so that the forward face of the rear flange 30 of the pressure normally abuts the rear face of the forward flange 54 of the retaining ring. The pins 40 act to slidingly support the pressure ring for movement relative to the adapter ring 44 so that the pressure ring can be urged against the spring pressure until the rearward face of the rear flange 30 abuts the forward face of the adapter ring 44.

The retaining 52 has an axial slot 56 formed forwardly from its rear edge. After the rotational position of the retaining ring 52 is adjusted on the adjuster ring 44 the retaining ring is rotated until the slot 56 is over the nearest set screw hole of the adapter ring and a set screw 58 is placed in the hole locking the ring in position. This controls the extent of axial movement of the pressure ring.

A typical tubular fastener adapted to be operated upon by the tool 10, generally indicated at 60, has an internal threaded section 62 at its forward end and an outwardly extending flange 64 at the opposite ends. The fastener may be used as a rivot, as for example, to join together a pair of sheets 66 of metal, wood or plastic having a pair of aligned holes 68 through which the tubular section of the fastener passes.

To set the fastener in the holes the fastener is first slipped over the bit so that the ferrous flange 64 abuts and is retained at the forward face of the magnet 36. In this position the pilot section 20 of the bit extends through threaded section 62 of the fastener and maintains the fastener in alignment on the bit. The fastener, while it is held on the tool, may be inserted through the aligned holes 68 until the flange rests against the exposed surface of the outer panels 66. The tool is then pressed toward the panels causing the pressure ring 26 to move rearwardly against the bias springs 45, and bringing the threaded section 22 of the bit into engagement with the internal threaded section 62 of the fastener. Continued rotation of the bit draws the forward end of the fastener 62 rearwardly along the threaded section of the bit, collapsing the intermediate section of the fastener.

The tool 10 preferably includes an appropriate slip clutch (not shown) so that when the fastener is fully collapsed the motor will not force further rotation of the bit. When that occurs, the button 18 is depressed reversing the rotation of the chuck 16 and allowing the tool 10 to be withdrawn from the set fastener.

The embodiments of the invention in which an exclusive property or privilege is claimed are defined as follows:

1. A tool for setting a tubular fastener having a flange at one end and an internally threaded section at the other end, collapsible toward the flange to set the fastener in a hole, comprising: a manually supported drive unit for powering a reversible chuck: an elongated bit having one end adapted to be supported in the chuck, having a pilot section at the opposite end configured to pass through said threaded section on the fastener, and a threaded section on the bit adjacent to the pilot section adapted to threadingly engage the threaded section on the fastener; an annular pressure pad supported on the power unit so as to surround the chuck area for motion in the direction of the axis of the chuck; means supported on the pressure pad for retaining and engaging the flange of a fastener; and means for biasing the pressure pad for motion toward the pilot end of the bit, whereby the pressure pad may retain and support a tubular fastener so that the pilot section of the bit is disposed within the threaded end of the fastener, for insertion into a hole and the threaded section of the bit will engage the threaded section of the fastener as the result of a force applied on the tool in the axis of the bit causing the pressure pad to move against its biasing means.

2. The tool of claim 1 wherein the distance between the threaded section of the bit and the means for retaining the flange of the fastener, when the pressure pad is disposed at its extreme of motion toward the pilot section of the bit, is less than the distance between the flange and the threaded section of the fastener.

3. The tool of claim 1 wherein said means for retaining the flange of the fastener on the pressure pad consists of a magnet supported on the forward surface of the pressure pad.

4. The tool of claim 1 including means for adjusting the limits of motion of the pressure pad.

5. An attachment for a manually supported tool having a reversible rotatable spindle to adapt the tool for setting tubular fasteners having a flange at one end and an internally threaded section at the other end which is collapsible toward the flange to set the fastener, comprising: an elongated bit having one end adapted to be supported in the spindle of the tool, having a pilot section with cross-sectional dimensions allowing it to pass through the internal thread on the fastener on the other end, and having a threaded section adapted to engage the internal thread on the fastener formed adjacent to the pilot section: an annular pressure ring for engaging and supporting the flange of the fastener: means for supporting said ring on the nonrotary section of the tool so that it surrounds the bit and is slidable axially with respect to the bit; and means for biasing said pressure ring toward its axial position wherein it is displaced from the stationary section of the tool.

* * * * *